US009108332B2

(12) United States Patent
Golden

(10) Patent No.: US 9,108,332 B2
(45) Date of Patent: Aug. 18, 2015

(54) SYSTEM, KIT AND/OR METHOD OF DECORATING A PAPERBOARD SHEET

(75) Inventor: Steven B. Golden, Easton, PA (US)

(73) Assignee: ArtSkills, Inc.

( * ) Notice: Subject to any disclaimer, the term of this patent is extended or adjusted under 35 U.S.C. 154(b) by 424 days.

(21) Appl. No.: 13/414,149

(22) Filed: Mar. 7, 2012

(65) Prior Publication Data

US 2012/0251983 A1 Oct. 4, 2012

Related U.S. Application Data

(60) Provisional application No. 61/450,120, filed on Mar. 7, 2011.

(51) Int. Cl.
*G09B 11/00* (2006.01)
*B26F 1/24* (2006.01)
*A63F 3/00* (2006.01)

(52) U.S. Cl.
CPC ... *B26F 1/24* (2013.01); *A63F 3/00* (2013.01); *A63F 3/0005* (2013.01)

(58) Field of Classification Search
CPC ........ F21S 4/001; F21V 19/0005; A63F 3/00; A63F 3/02
USPC ............................................................ 434/81
See application file for complete search history.

(56) References Cited

U.S. PATENT DOCUMENTS 4,196,539 A 4/1980 Speers
D293,088 S * 12/1987 Brown et al. ............. D10/106.1
4,978,303 A * 12/1990 Lampbell ...................... 434/258
5,149,084 A * 9/1992 Dalebout et al. .................. 482/3
5,524,637 A * 6/1996 Erickson ....................... 600/592
5,916,063 A * 6/1999 Alessandri ........................ 482/4
5,937,387 A * 8/1999 Summerell et al. ............... 705/2
5,944,633 A * 8/1999 Wittrock ........................... 482/4
5,976,083 A * 11/1999 Richardson et al. .......... 600/300
6,013,007 A * 1/2000 Root et al. ........................ 482/8
6,238,261 B1 5/2001 Lang
6,450,922 B1 * 9/2002 Henderson et al. ............... 482/8
6,458,060 B1 * 10/2002 Watterson et al. .............. 482/54
6,645,038 B2 11/2003 Trotto
6,736,759 B1 * 5/2004 Stubbs et al. ...................... 482/8
7,005,970 B2 * 2/2006 Hodsdon et al. .......... 340/323 R
7,056,265 B1 * 6/2006 Shea ................................ 482/8

(Continued)

OTHER PUBLICATIONS

Belardo Lights. accessed from http://w w w .belardolights.com/name_board.htm. retreival date May 10, 2008.*

*Primary Examiner* — Robert J Utama
(74) *Attorney, Agent, or Firm* — Belles Katz LLC

(57) ABSTRACT

A display system or kit for displaying lights on a paper board product. In one embodiment, the invention can be a display system comprising: sheet of paperboard having a plurality of holes extending from a front surface to a rear surface of the paperboard; a light assembly comprising a string of lights and a controller comprising an internal power source, the string of lights comprising a plurality of light modules arranged in a spaced apart manner along a length of wire, each of the light modules comprising a light portion capable of being alternated between an illuminated state and a non-illuminated state via the controller; and the light portions of the string of lights extending through the holes of the paperboard so as to protrude from the front surface of the paperboard, the wire of the light assembly located adjacent the rear surface of the paperboard.

13 Claims, 9 Drawing Sheets

(56) References Cited

U.S. PATENT DOCUMENTS

| | | | | |
|---|---|---|---|---|
| 7,072,789 | B2 * | 7/2006 | Vock et al. | 702/141 |
| 7,165,861 | B2 | 1/2007 | Wickart | |
| 7,220,220 | B2 * | 5/2007 | Stubbs et al. | 482/72 |
| 7,534,206 | B1 * | 5/2009 | Lovitt et al. | 600/300 |
| 8,126,143 | B2 * | 2/2012 | Daniel et al. | 380/239 |
| D655,267 | S * | 3/2012 | Daniel | D14/137 |
| 8,136,280 | B2 | 3/2012 | Spelman | |
| 2001/0041647 | A1 * | 11/2001 | Itoh et al. | 482/9 |
| 2002/0055857 | A1 * | 5/2002 | Mault | 705/2 |
| 2002/0091796 | A1 * | 7/2002 | Higginson et al. | 709/218 |
| 2002/0132211 | A1 * | 9/2002 | August et al. | 434/247 |
| 2004/0153007 | A1 * | 8/2004 | Harris et al. | 600/587 |
| 2005/0107216 | A1 * | 5/2005 | Lee et al. | 482/8 |
| 2005/0170870 | A1 * | 8/2005 | Goldenberg et al. | 455/575.2 |
| 2006/0247808 | A1 * | 11/2006 | Robb | 700/91 |
| 2007/0135243 | A1 * | 6/2007 | LaRue et al. | 473/467 |
| 2008/0113578 | A1 | 5/2008 | McAlaine et al. | |
| 2008/0280730 | A1 * | 11/2008 | Alexanderson | 482/9 |

* cited by examiner

SYSTEM, KIT AND/OR METHOD OF DECORATING A PAPERBOARD SHEET

CROSS-REFERENCE TO RELATED APPLICATIONS

This application claims the benefit of U.S. Provisional Patent Application No. 61/450,120, filed Mar. 7, 2011, the entirety of which is hereby incorporated by reference.

FIELD OF THE INVENTION

The present invention relates generally to a system, kit and/or method of decorating a paperboard sheet, and specifically to a reusable system, kit and/or method for displaying lights on a paperboard product in a variety of user preferred configurations.

BACKGROUND OF THE INVENTION

Paperboard products, such as posterboard, are used by adults and children for both business and personal purposes. Paperboard is used for everything from school projects, presentations, elections, special promotions and special occasions. Paperboard products are frequently used to display information at events, and therefore are often cut, colored and decorated to catch the eye of observers. Furthermore, paperboard products come in a variety of colors, shapes and sizes, and may be decorated, manipulated, and/or combined in a manner that best conveys a desired message.

The decoration of paperboard products usually takes the form of drawing, coloring, printing and/or pasting decorations on the face of the paperboard. However, other then using bright colors and big, bold type, there are a limited number of ways to make paperboard stand out to grab the attention of observers. Therefore, there is a need for a kit that can bring greater attention to a decorated or displayed paperboard.

Another issue with existing paperboard is that the paperboard and decorations are usually thrown out after a single display because they are only good for one application. Thereafter, when the user desires to create a new paperboard for a new project, presentation, or special occasion, a whole new set of decorations must be created from scratch. Therefore, there is a need for a paperboard decoration kit that is reusable from one application to the next.

SUMMARY OF THE INVENTION

The present invention is directed to a reusable kit for displaying lights on a paper board product in a variety of user preferred configurations.

In one embodiment, the invention can be a kit for decorating a paperboard sheet comprising: a package comprising: a hole punch comprising a handle portion, a punching portion and a shoulder between the handle portion and the punching portion, the punching portion having a tapered section that terminates in a distal tip; a light assembly comprising a string of lights, the string of lights comprising a plurality of light modules arranged in a spaced apart manner along a length of wire, each of the light modules comprising a light portion capable of being alternated between an illuminated state and a non-illuminated state; and wherein the light portion has a maximum transverse diameter and the punching portion has a maximum transverse diameter, the maximum transverse diameter of the light portion being substantially equal to the maximum transverse diameter of the punching portion, the shoulder having a maximum transverse diameter that is greater than the maximum transverse diameter of the punching portion.

In another embodiment, the invention can be a display system comprising: a sheet of paperboard having a plurality of holes extending from a front surface to a rear surface of the paperboard; a light assembly comprising a string of lights and a controller comprising an internal power source, the string of lights comprising a plurality of light modules arranged in a spaced apart manner along a length of wire, each of the light modules comprising a light portion capable of being alternated between an illuminated state and a non-illuminated state via the controller; the light portions of the string of lights extending through the holes of the paperboard so as to protrude from the front surface of the paperboard, the wire of the light assembly located adjacent the rear surface of the paperboard.

In yet another embodiment, the invention can be a method of decorating a paperboard sheet comprising: providing a punch comprising a handle portion, a punching portion and a shoulder between the handle portion and the punching portion, the punching portion having a tapered section that terminates in a distal tip, the punching portion having a maximum transverse diameter; forming at least one hole in the paperboard sheet by pushing the punching portion of the punch through the paperboard sheet, the hole extending from a front surface to a rear surface of the paperboard sheet; providing a light assembly comprising a string of lights, the string of lights comprising a plurality of light modules arranged in a spaced apart manner along a length of wire, each of the light modules comprising a light portion capable of being alternated between an illuminated state and a non-illuminated state; and inserting the light portion of one of the light modules through the hole formed in the paperboard sheet so that the light portion protrudes from the front surface of the paperboard sheet, wherein the light portion has a maximum transverse diameter is, substantially equal to the maximum transverse diameter of the punching portion.

In still another embodiment, the invention can be a kit for decorating a paperboard sheet comprising: a package comprising: a hole punch comprising a handle portion and a punching portion, the punching portion having a tapered section that terminates in a distal tip; a light assembly comprising a string of lights, the string of lights comprising a plurality of light modules arranged in a spaced apart manner along a length of wire, each of the light modules comprising a light portion capable of being alternated between an illuminated state and a non-illuminated state; and wherein the light portion has a maximum transverse diameter and the punching portion has a maximum transverse diameter, the maximum transverse diameter of the light portion being 0% to 10% greater than the maximum transverse diameter of the punching portion.

In a further embodiment, the invention can be a kit for decorating a paperboard sheet comprising: a package comprising: a hole punch comprising a handle portion and a punching portion, the punching portion having a tapered section that terminates in a distal tip; a light assembly comprising a string of lights, the string of lights comprising a plurality of light modules arranged in a spaced apart manner along a length of wire, each of the light modules comprising a light portion capable of being alternated between an illuminated state and a non-illuminated state; and wherein the light portion has a maximum transverse diameter and the punching portion has a maximum transverse diameter, the maximum transverse diameter of the light portion being substantially equal to the maximum transverse diameter of the punching portion.

In still a further embodiment, the invention can be a display system comprising: a sheet of paperboard having a plurality of holes extending from a front surface to a rear surface of the paperboard; a light assembly comprising a string of lights, the string of lights comprising a plurality of light modules arranged in a spaced apart manner along a length of wire, each of the light modules comprising a light portion capable of being alternated between an illuminated state and a non-illuminated state; and the light portions of the string of lights extending through the holes of the paperboard so as to protrude from the front surface of the paperboard, the wire of the light assembly located adjacent the rear surface of the paperboard.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
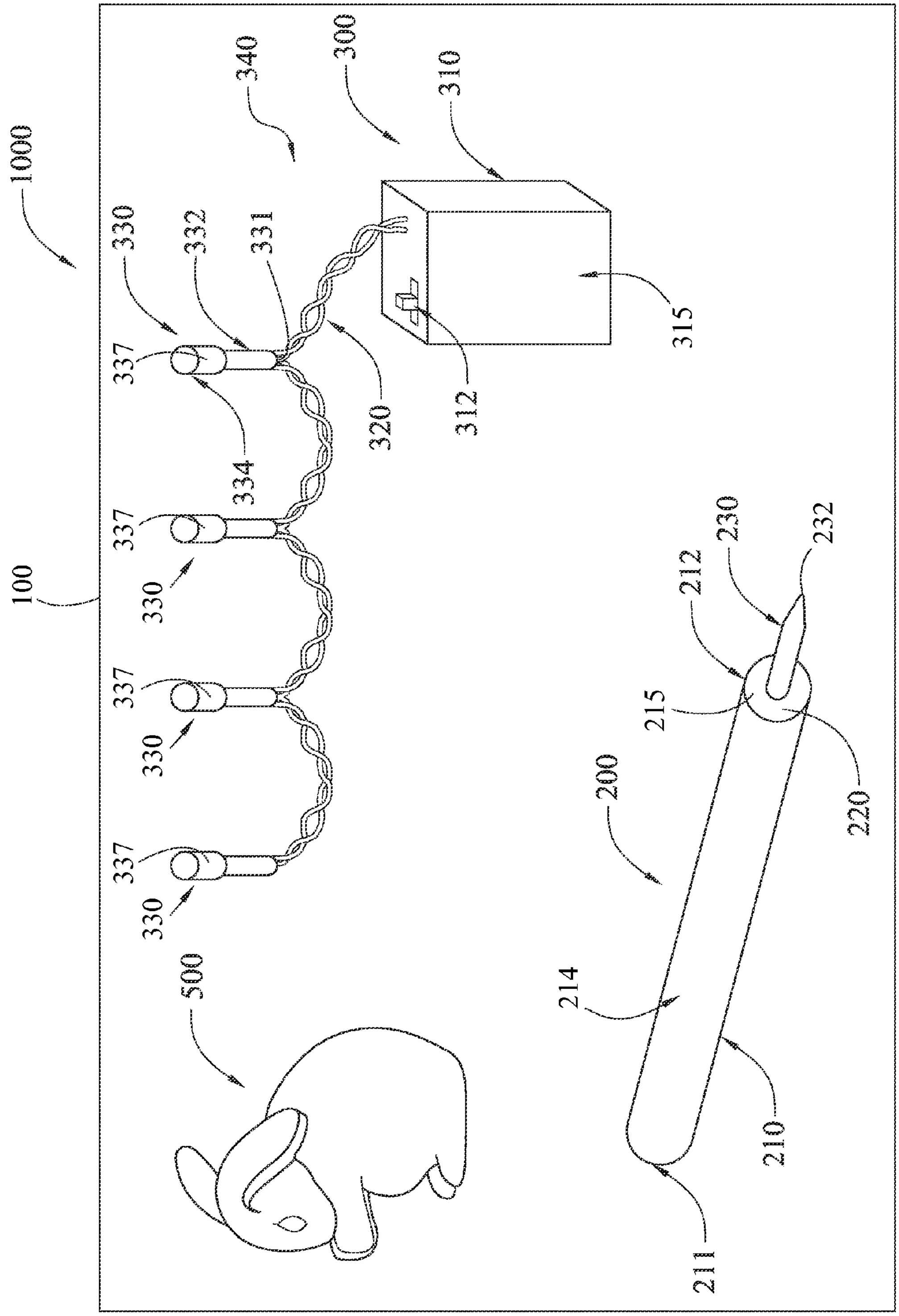
FIG. 1 is a perspective view of a kit comprising a package having a hole punch, a light assembly and a light transmissive cap in accordance with a first embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of the exemplary embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

Referring first to FIG. 1, a kit 1000 in accordance with an embodiment of the present invention is illustrated. The kit 1000 is used for decorating a paperboard sheet as will be discussed in more detail below. The kit 1000 comprises a package 100 that can be formed of a cardboard, plastic or other material. The package 100 is a container, box or other device that is used to contain the remaining components of the kit 1000 therein when the kit 1000 is located on a shelf in a store for sale or in a transport vehicle when being moved from the manufacturing site to the store shelf. Furthermore, the package 100 can be used to contain the components of the kit 1000 after the kit 1000 is purchased by a consumer in order to keep the components of the kit 1000 together. In certain embodiments, the package 100 includes indicia on its outer surfaces to indicate the contents of the package 100 and to provide instructions on use of the contents. Furthermore, the indicia may include manufacturer information, a barcode, illustrations of the product being used and other markings that are placed on packages that contain products for sale therein.

In the exemplified embodiment, the package 100 generally comprises a hole punch 200, a light assembly 300, and at least one light transmissive cap 500. Of course, the invention is not to be so limited and in certain other embodiments the package 100 may contain the hole punch 200 and the light assembly 300 while omitting the light transmissive cap 600. In such embodiments, the light transmissive cap 600 can be packaged and sold separately from the package 100 containing the hole punch 200 and the light assembly 300. Furthermore, in still other embodiments the package 100 includes the hole punch 200, the light assembly 300, and a plurality of the light transmissive caps 600. Thus, the exact contents of the package 100 are not to be limited in all embodiments by that which is illustrated in the package 100 in FIG. 1.

In certain embodiments, the package 100 is sold as a unit to consumers so that consumers can purchase the entire contents of the package 100, and hence also of the kit 1000, in a single exchange. In certain embodiments, the kit 1000 is intended to be used with a paperboard sheet 400 (see FIG. 3A). Thus, in certain embodiments the kit 1000 also includes the paperboard sheet 400 such that the hole punch 200, the light assembly 300, the light transmissive cap 500 and the paperboard sheet 400 can be packaged and sold together. The paperboard sheet 400 may be any type of sheet that is known to be decorated for display during a presentation, as artwork or the like. Thus, the paperboard sheet 400 may be formed from, for example without limitation, matte board, posterboard, packaging blanks, foam board, rigid paperboard, bristle board, corrugated board, and other flat paper products that can be decorated and used to present content or other information to observers. Furthermore, it should be appreciated that while the invention will be described herein with regard to using the contents of the kit 1000 with the paperboard sheet 400 or other paperboard product, the invention is not to be so limited in all embodiments.

Figure 2A:
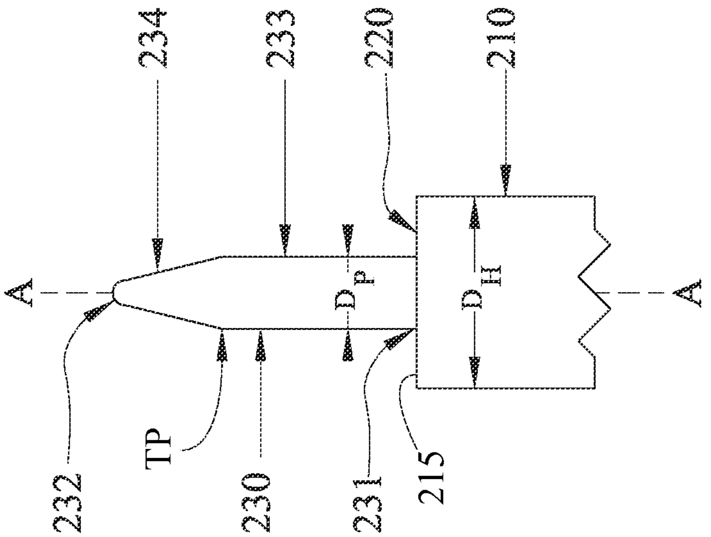
FIG. 2A is a front view of a portion of the hole punch of FIG. 1.

Referring to FIG. 1 and FIG. 2A concurrently, the hole punch 200 will be further described. The hole punch 200 generally comprises a handle portion 210, a shoulder 220 and a punching portion 230. The hole punch 200 extends along a longitudinal axis A-A from a proximal end 211 of the handle portion 210 to a distal tip 232 of the punching portion 230. The hole punch 200 has a length measured from the proximal end 211 of the handle portion 210 to the distal tip 232 of between 13-17 cm, more preferably between 14-16 cm, and most preferably between 14-15 cm. Of course, the invention is not to be limited by the length of the hole punch 200 in all embodiments.

As will be discussed in more detail below with reference to FIGS. 3A-3B, the hole punch 200 is used to create a hole in the paperboard sheet 400 by inserting the hole punch 200 into and through the paperboard sheet 400 and then removing the hole punch 200 from the paperboard sheet 400. In the exemplified embodiment, the hole punch 200 is formed from wood. However, the invention is not to be so limited in all embodiments and the hole punch 200 may be made out of any material that is capable of punching a hole through the paperboard sheet 400 such as, for example, metal, metal alloy, plastic, engineered wood and the like. Furthermore, in still other embodiments, the hole punch 200 may be made out of more than one material such that the hole punch 200 is formed from multiple components. For example, in certain embodiments the hole punch 200 may have a base formed out of one of the materials listed above and an overlayer formed from a thermoplastic elastomer or other rubber-like material to enhance the comfort and gripability of the hole punch 200.

The handle 210 of the hole punch 200 extends from the proximal end 211 to a distal end 212. Furthermore, the handle 210 of the hole punch 200 has a length measured from the proximal end 211 to the distal end 212 of between 11-14 cm, and more preferably between 12-13 cm. The distal tip 232 of the hole punch 200 has a length measured from the distal end 212 of the handle 210 to the distal tip 232 of the hole punch 200 that is between 0.5-3 cm, and more preferably between 1.3-2.0 cm. Of course, the invention is not to be limited by the length of the handle 210 of the hole punch 200 or the length of the distal tip 232 of the hole punch 200 in all embodiments. The distal end 212 of the handle 210 forms the shoulder 220 from which the punching portion 230 of the hole punch 200 extends. In certain embodiments, the shoulder 220 may be omitted such that the handle portion 210 transitions directly into the punching portion 230.

In the exemplified embodiment, the handle 210 is an elongated member that is generally cylindrical in shape and has a substantially circular cross-section. Furthermore, the handle 210 comprises a smooth outer surface 214. However, the invention is not to be so limited in all embodiments and the handle 210 may take on any other shape such as, for example, triangular, rectangular, hexagonal, or octagonal. Furthermore, in certain embodiments the outer surface 214 of the handle 210 of the hole punch 200 may include grooves or other undulations for more comfortable gripping by a user's fingers.

In the exemplified embodiment, the handle 210 comprises a substantially constant diameter $D_H$ along the entirety of the length of the handle 210. Thus, the diameter $D_H$ is substantially constant from the proximal end 211 of the handle 210 to the distal end 212 of the handle 210. The invention, however, is not to be so limited in all embodiments and the diameter $D_H$ of the handle 210 may not be constant in certain other embodiments, including embodiments that have grooves or other undulations for user comfort as described above. In the exemplified embodiment, the diameter $D_H$ of the handle 210 is between 5-10 mm, and more preferably between 7-8 mm, and still more preferably approximately 7.5 mm. Of course, the invention is not to be limited by the particular measurements of the diameter $D_H$ of the handle 210 in all embodiments.

As noted above, the shoulder 220 is located at the distal end 212 of the handle 210 and extends transverse to the longitudinal axis A-A. In the exemplified embodiment, the shoulder 220 extends orthogonal to the longitudinal axis A-A. The shoulder 220 acts as the interface between the handle 210 and the punch portion 230, and forms an annular flange 215 at a base 231 of the punch portion 230.

The punch portion 230 comprises the base 231, the distal tip 232, a non-tapered section 233, a tapered section 234, and a maximum diameter $D_P$. In the exemplified embodiment, the maximum diameter $D_P$ of the punch portion 230 is between 2-6 mm, more preferably between 3-5 mm, and still more preferably approximately 4.5 mm. Of course, the invention is not to be limited by the specific measurements of the maximum diameter $D_P$ of the punch portion 230 in all embodiments.

The base 231 of the punch portion 230 is connected to the handle 210 at the shoulder 220. The punch portion 230 is generally conical in shape such that the maximum diameter $D_P$ of the punch portion 230 is located at the non-tapered section 233 of the punch portion 230. Of course, the invention is not to be so limited in all embodiments and the punch portion 230 may take on shapes other than conical as long as the punch portion 230 is capable of punching holes through the paperboard sheet 400 as will be described below. The punch portion 230 is substantially concentric with the handle 210 along the longitudinal axis A-A and the shoulder 200 extends radially outward from the punch portion 230. The base 231 of the punch portion 230 has a substantially circular cross-section. The invention, however, is not to be so limited in all embodiments and the cross section of the base 231 of the punch portion 230 may be any other shape such as, for example, triangular, rectangular, hexagonal, or octagonal.

The punch portion 230 extends from the shoulder 220 to the distal tip 232 along the longitudinal axis A-A. More specifically, the non-tapered section 233 of the punch portion 230 extends from the shoulder 220 to a transition point TP between the non-tapered section 233 and the tapered section 234. The tapered section 234 of the punch portion 230 extends from the transition point TP and terminates in the distal tip 232. The non-tapered section 233 of the punch portion 230 has a substantially constant diameter and the tapered section 234 of the punch portion 230 has a diameter that decreases with axial distance from the transition point TP towards the distal tip 232. Thus, the tapered section 234 tapers inwardly as it extends from the non-tapered section 233 towards the distal tip 232. In certain embodiments, the non-tapered section 234 of the punch portion 230 may be omitted such that the punch portion 230 tapers along the entirety of its length from the shoulder 230 to the distal tip 232. In the exemplified embodiment, the maximum transverse diameter $D_H$ of the handle 210 is larger than the maximum transverse diameter $D_P$ of the punch portion 230. Thus, in the exemplified embodiment the shoulder 220 has a maximum transverse diameter that is greater than the maximum transverse diameter $D_P$ of the punch portion 230.

Figure 2B:
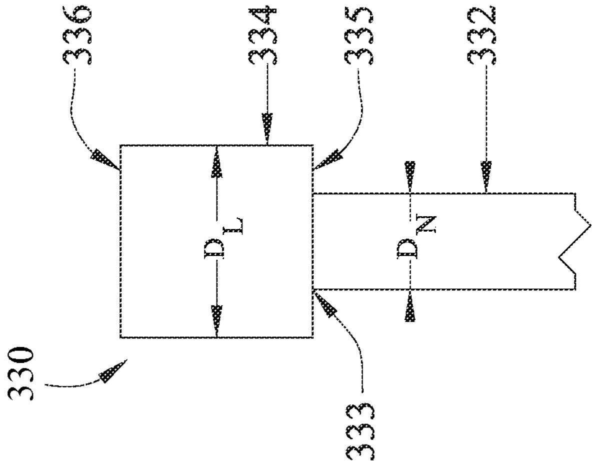
FIG. 2B is a front view of a portion of a light module of the light assembly of FIG. 1.

Referring to FIG. 1 and FIG. 2B concurrently, the light assembly 300 will be further described. The light assembly 300 generally comprises a controller 310 and a string of lights 340. The string of lights 340 generally comprises a plurality of light modules 330 that are arranged in a spaced apart manner along a length of wire 320. Each of the light modules 330 comprises a light portion 334 that is capable of being alternated between an illuminated state and a non-illuminated state. In certain embodiments, the controller 310 is used to control the illumination of the light portions 334 of the light modules 330. Thus, the light assembly 300 is configured to provide power to and light up the light portions 334 of the light modules 330 as desired.

The controller 310 comprises a housing 315 that contains an internal power source (not shown), an integrated circuit (not shown), and a switch 312. The controller, via the power source, switch and integrated circuit, is configured to deliver power to the string of lights 340 thereby illuminating the light portions 334 of the light modules 330. In the exemplified embodiment, the housing 315 is formed from a hard plastic material to provide the controller 310 with structural rigidity in order to protect the internal components (i.e., the internal power source and the integrated circuit) against damage. The invention, however, is not to be so limited in all embodiments and the housing 315 of the controller 310 may be made of other suitable materials such as, for example, metal, metal alloy, or soft plastic materials. In certain embodiments, the power source comprises two AA batteries. However, the invention is not to be so limited in all embodiments and the power source may be any other power source such as, for example, a plug for AC power, a plug for DC power, or another type or number of batteries.

The switch 312 is an on/off switch that causes the controller 310 to transmit power to the string of lights 340 in an "on" position and causes the controller 310 to cease the transmission of power to the string of lights 340 in an "off" position. More specifically, the integrated circuit is configured to transmit power to the string of lights 340 when the switch 312 is in the "on" position and prevent the transmission of power to the string of lights 340 when the switch 312 is in the "off" position. In the exemplified embodiment, the switch 312 is a sliding switch that is manually slidable from the "on" position to the "off" position. However, the invention is not to be so limited in all embodiments and in certain other embodiments the switch can be a button-type switch or other biased switches, a toggle switch, or the like. Furthermore, in still other embodiments the switch 312 may be operated remotely by a remote control via infrared, Bluetooth, or the like.

As noted above, the string of lights 340 comprises the wire 320 and at least one light module 330. In the exemplified embodiment, the string of lights 340 comprises a plurality of the light modules 330. Specifically, in the exemplified embodiment the string of lights 340 is illustrated with four light modules 330. Of course, the invention is not to be limited by the number of light modules 330 that are in the string of lights 340 in all embodiments.

The wire 320 is connected to and extends out from the controller 310 and into each light module 330 of the string of lights 340. More specifically, the wire 320 is electrically coupled to the integrated circuit of the controller 310, which is located within the housing 315, so that the wire 320 can transmit power to the light modules 330 when the switch 312 is in the "on" position as has been discussed above. Furthermore, the wire 320 extends into and is electrically coupled to each of the light modules 330. Thus, the wire 320 connects adjacent light modules 330 and provides power from the power source of the controller 310 to each light module 330. In the exemplified embodiment, the wire 320 is flexible. Of course, the invention is not to be so limited in all embodiments and in certain other embodiments the wire 320 can be rigid or otherwise inflexible. However, flexibility in the wire 320 is preferred to enable the light modules 330 to be connected to the paperboard sheet 400 in a variety of configurations.

As noted above, the light modules 330 are arranged in a spaced apart manner along a length of the wire 320. In certain embodiments, the light modules 330 are spaced apart along the length of wire 320 between 3 and 10 inches, and more preferably approximately 5 inches. However, the invention is not to be so limited in all embodiments and the light modules 330 may be spaced apart more than 10 inches or less than 3 inches in certain other embodiments. Further, in still other embodiments, the spacing distance between adjacent light modules 330 may vary along the length of wire 320.

Each light module 330 comprises a neck portion 332 and the light portion 334. Furthermore, as has been described herein above, each light module 330 is configured to illuminate light. Therefore, each light module 330 comprises an illumination element (not shown) that is located within a housing 337 of the light module 330. The housing 337 forms both the neck portion 332 and the light portion 334 of the light module 330. The neck portion 332 comprises a proximal end 331 and a distal end 333. Furthermore, the light module 330 receives the wire 320 through the proximal end 331 of the neck portion 332 to facilitate providing power to the light module 330 for illuminating the light portion 334 of the light module 330.

The neck portion 332 is narrowed relative to the light portion 334. Thus, as will be described below with reference to FIGS. 4A and 4B, when the light module 330 is located within a hole formed into the paperboard sheet 400, the light portion 334 protrudes from the hole and extends from a front surface of the paperboard sheet 400 while the neck portion 332 is positioned within the hole. Because the light portion 334 has a larger diameter than the neck portion 332, the light portion 334 is not easily pulled through the hole once inserted therein. The neck portion 332 is generally cylindrical in shape and has a substantially circular cross-section. The invention, however, is not to be so limited in all embodiments and the cross section of the neck portion 332 may be any other shape such as, for example, conical, triangular, rectangular, hexagonal, octagonal, or the like.

The light portion 334 of each light module 330 extends from a proximal end 335 to a distal end 336. The light portion 334, and more specifically the portion of the housing 337 that forms the light portion 334, is configured to be light transmissive. In the exemplified embodiment, the light portion 334, or the portion of the housing 337 that forms the light portion 334, is made of a hard plastic. The invention, however, is not to be so limited in all embodiments and the light portion 334 may be made of any material that is light transmissive such as, for example, glass or plastic. The proximal end 335 of the light portion 334 is adjacent to the distal end 333 of the neck portion 332 and the proximal end 335 of the light portion 334 forms an annular flange relative to the distal end 333 of the neck portion 332 that assists in preventing pull-through of the light module 330. The light portion 334 is generally cylindrical in shape and has a substantially circular cross-section. The invention, however, is not to be so limited in all embodiments and the cross section of the light portion 334 may be any other shape such as, for example, conical, triangular, rectangular, hexagonal, or octagonal.

The neck portion 332 of each light module 330 has a maximum transverse diameter $D_N$, and the light portion 334 of each light module 330 has a maximum transverse diameter $D_L$. In the exemplified embodiment, the maximum transverse diameter $D_N$ of the neck portion 332 is less than the maximum transverse diameter $D_L$ of the light portion 334. However, the invention is not to be so limited in all embodiments and the maximum transverse diameter $D_N$ of the neck portion 332 can be equal to or greater than the maximum transverse diameter $D_L$ of the light portion 334 in other embodiments.

Furthermore, in the exemplified embodiment the maximum transverse diameter $D_L$ of the light portion 334 is substantially equal to the maximum transverse diameter $D_P$ of the punch portion 230. Thus, the maximum transverse diameter $D_L$ of the light portion 334 is similarly substantially equal to the maximum diameters of the holes formed by the punch portion 230 into the paperboard sheet 230. In certain other embodiments, the maximum transverse diameter $D_L$ of the light portion 334 is up to 10% greater than the maximum transverse diameter $D_P$ of the punch portion 330. Thus, the maximum transverse diameter $D_L$ of the light portion 334 is similarly up to 10% greater than the maximum diameters of the holes formed by the punch portion 230 into the paperboard sheet 400. Of course, in still other embodiments, the maximum transverse diameter $D_L$ of the light portion 334 may be more than 10% greater than the maximum transverse diameter $D_P$ of the punch portion 330.

When supplied with power from the power source of the controller 310 and through the wire 320, each light module 330, and more specifically a light source housed within each light module 330, is made to illuminate. In one embodiment, each light module 330 is configured to illuminate white light. However, in other embodiments each light module 330 may illuminate another color light, such as, for example, blue, red, yellow, green, purple, or orange light. Further, in other embodiments some of the light modules 330 of the string of lights 340 may illuminate one color light while other light modules 330 on the string of lights 340 may illuminate another color light. The light modules 330 of the string of lights 340 need not all illuminate the same color light and can therefore illuminate various colors of light. In one embodiment, the string of lights 340 comprises twenty lights 330. The invention, however, is not so limited and the string of lights 340 may comprise any number of light modules 330 such as, for example, ten lights, twelve lights, fifteen lights, twenty-five or more than twenty-five light modules 330.

In one embodiment, the switch 312 of the controller 310 is configured for three settings, on, off and blinking/flashing. When the switch 312 is in the off position, no power is delivered from the controller 310 to the string of lights 340 so that none of the light modules 330 are illuminated. When the switch 312 is in the on position, power is delivered from the controller 310 to the string of lights 340 so that all of the light modules 330 are illuminated. When the switch 312 is in the blinking/flashing position, power is intermittently delivered from the controller 310 to the string of lights 340 so that all of the light modules 330 are intermittently illuminated. The invention, however, is not so limited and the switch 312 may be configured with more or less than three settings, and may be configured with settings other than on, off and blinking.

Figure 2C:
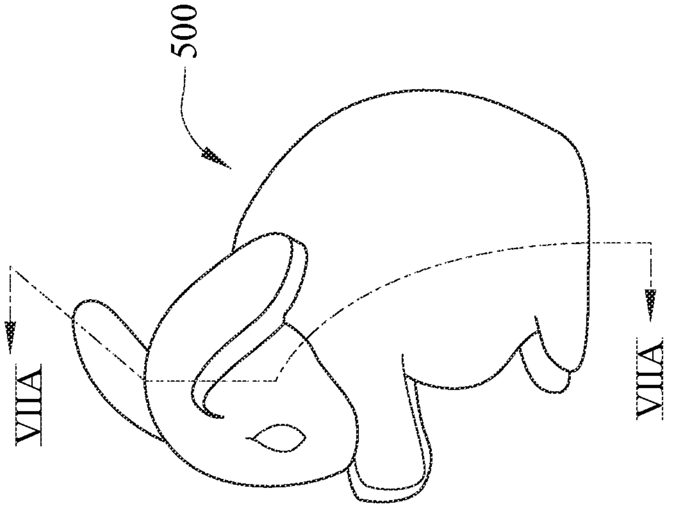
FIG. 2C is a front view of a generically illustrated light transmissive cap in accordance with an embodiment of the present invention.

Referring now to FIGS. 1 and 2C concurrently, the light transmissive cap 500 will be described in greater detail. As noted above, in certain embodiments the light transmissive cap 500 may be omitted from the package 100 such that the light transmissive cap 500 is separately packaged and sold relative to the hole punch 200 and the light assembly 300. In such embodiments the kit 1000 comprises only the hole punch 200 and the light assembly 300, and hence the package 100 contains only the hole punch 200 and the light assembly 300 therein.

In the exemplified embodiment, the light transmissive cap 500 is illustrated in the shape of a rabbit. Of course, the invention is not to be limited by the particular shape that the light transmissive cap 500 takes in all embodiments. Rather, in certain embodiments the light transmissive cap 500 may be in the shape of a three-dimensional decorative sculpture, such as an animal as is exemplified in FIGS. 1 and 2C, or any other three-dimensional decorative sculpture such as, for example without limitation, an insect, a plant, a heart, a letter, a number, a vehicle, a logo, or the like. Further, the three-dimensional decorative sculpture may be of any size.

As will be discussed in more detail below with reference to FIGS. 7A and 8, the three-dimensional decorative structure may be formed with a bore therein, or an extending member having a bore formed therein may extend from a lower surface of the three-dimensional decorative structure. The bore is sized and configured for slidably receiving the light portion 334 of the light modules 330 therein as will be discussed below with reference to FIG. 7B.

The light transmissive cap 500 is formed from a plastic material that is transmissive to light. Of course, the invention is not to be so limited and in certain other embodiments the light transmissive cap 500 can be formed from other materials that are transmissive to light such as glass. Furthermore, it should be appreciated that a light transmissive material is any material that enables light to pass through it. In certain embodiments, the light transmissive cap 500 is formed from a clear material to facilitate enabling light to pass therethrough. However, the invention is not to be so limited in all embodiments and in certain other embodiments the light transmissive cap 500 may take on other colors such as, for example without limitation, blue, green, red, purple, orange, yellow or the like, so long as the light transmissive cap 500 enables light to pass-through it. In still other embodiments, the light transmissive cap 500 may be decorated with features that alter the light as it illuminates through the light transmissive cap 500, such as for example sparkles, glitter, and indentations or decorative grooves formed therein. As a result of its light transmissivity, light that illuminates from the light portion 334 of the light modules 330 will pass through the light transmissive cap 500 when the light transmissive cap 500 is coupled to the light portion 334 of the light modules 330 as will be described below.

Figure 3A:
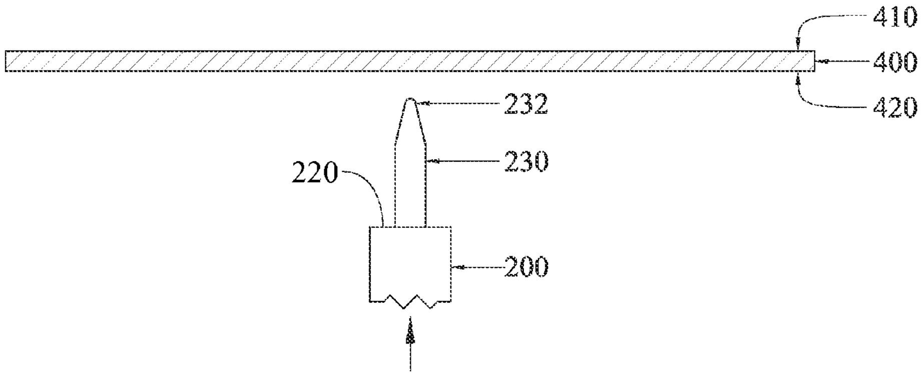
FIG. 3A is a schematic front view of the hole punch of FIG. 1 aligned with a bottom surface of a paperboard sheet.
Figure 3B:
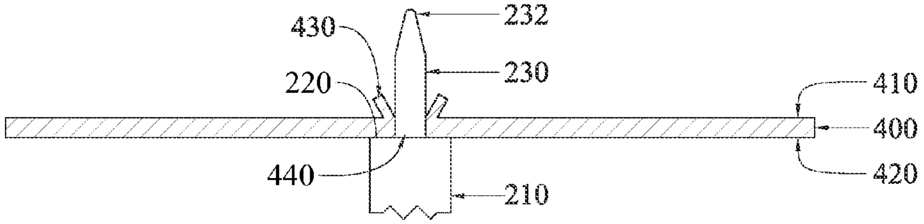
FIG. 3B is a schematic front view of the hole punch of FIG. 1 forming a hole through the paperboard sheet.
Figure 3C:
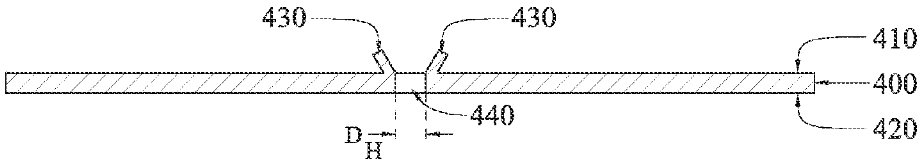
FIG. 3C is a schematic front view of the paperboard sheet of FIG. 3A after the hole punch of FIG. 1 has formed a hole therein.

Referring to FIGS. 3A-3C concurrently, a method of decorating the paperboard sheet 400 using the kit 1000 will be described. Referring first to FIG. 3A, the paperboard sheet 400 and the hole punch 200 are provided. In the exemplified embodiment, the paperboard sheet 400 is a substantially flat paper-like sheet that is of the type commonly used for display or presentation, such as a piece of posterboard or foam board. The paperboard sheet 400 comprises a front surface 410 and an opposing rear surface 420. The hole punch 200 is aligned with the paperboard sheet 400 such that the distal tip 232 of the punching portion 230 of the hole punch 200 is aligned with the rear surface 420 of the paperboard sheet 400. Furthermore, in the exemplified embodiment the distal tip 232 is oriented substantially perpendicular to the rear surface 420 of the paperboard sheet 400. Of course, the invention is not to be so limited in all embodiments and in certain other embodiments the hole punch 200 may be oriented at an angle other than perpendicular to the rear surface 420 of the paperboard sheet 400.

Referring no to FIG. 3B, the method of decorating the paperboard sheet 400 will be further described. When it is desired to decorate the paperboard sheet 400, the hole punch 200 is used to puncture a hole 440 into the paperboard sheet 400. Specifically, the hole punch 200 is pushed against the rear surface 420 of the paperboard sheet 400 with sufficient force so that the distal tip 232 of the hole punch 200 punctures the paperboard sheet 400 and extends through the paperboard sheet 400 thereby forming a hole 440 into the paperboard sheet 400. As the distal tip 232 extends through the paperboard sheet 400, the distal tip 232 and at least a portion of the punch portion 230 of the hole punch 200 extends through the paperboard sheet 400 and protrudes from the front surface 410 of the paperboard sheet 400. In certain embodiments, the hole punch 200 is extended into the paperboard sheet 400 until the shoulder 220 of the hole punch 200 abuts against the rear surface 420 of the paperboard sheet 400. As a result, the hole 446 formed into the paperboard sheet 400 has a diameter $D_H$ that is substantially equal to the maximum transverse diameter $D_P$ of the punch portion 230 of the hole punch 200.

The puncturing of the paperboard sheet 400 creates projections 430 on the front surface 410 of the paperboard sheet 400. Specifically, the projections 430 are created as a result of the punch portion 230 extending through and displacing the portion of the paperboard sheet 400 that was located in the area that is now a hole 440 in the paperboard sheet 400.

Referring to FIG. 3C, the paperboard sheet 400 is illustrated after the punch portion 230 of the hole punch 200 has been used to create the hole 440 in the paperboard sheet 400 and has then been removed from the paperboard sheet 400. As the hole punch 200 is pulled away from the paperboard sheet 400 via the rear surface 420 of the paperboard sheet 400, a hole 440 remains that extends from the front surface 410 of the paperboard sheet 400 to the rear surface 420 of the paperboard sheet 400. The hole 440 has substantially the same shape as the cross-sectional shape of the punch portion 230 of the hole punch 200. The method described above and illustrated in FIGS. 3A-3C may be repeated multiple times in order to create a plurality of the holes 440 in the paperboard sheet 400. In certain embodiments, the number of holes 440 created in the paperboard sheet 400 is the same as the number of light modules 330 the user desires to have displayed on the front surface 410 of the paperboard sheet 400 as will be described below with reference to FIGS. 4A-4B.

Figure 4A:
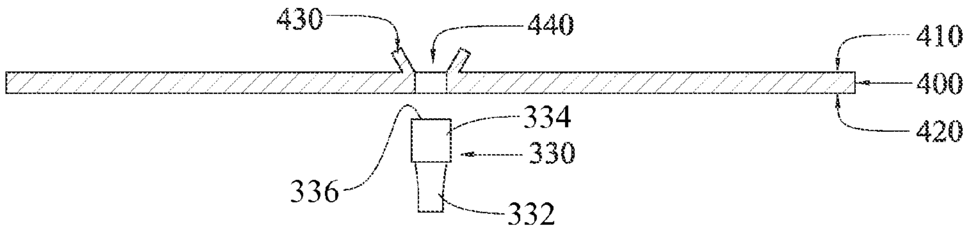
FIG. 4A is a schematic front view of the light module of FIG. 2B aligned with the hole formed in the paperboard sheet in FIG. 3C.
Figure 4B:
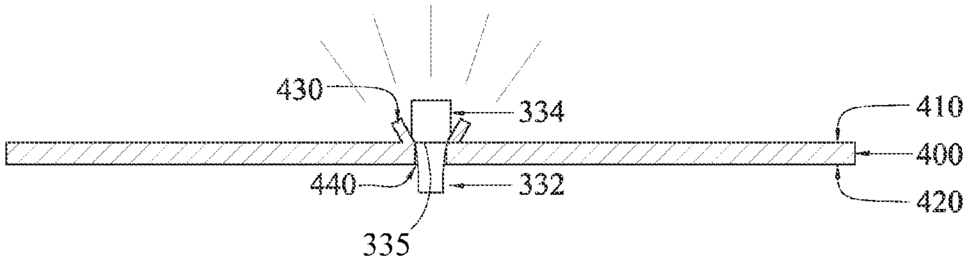
FIG. 4B is a schematic front view of the light module of FIG. 2B inserted into the hole formed in the paperboard sheet in FIG. 3C.

Referring to FIGS. 4A-4B concurrently, the method of decorating the paperboard sheet 400 will continue to be described with regard to inserting one of the light modules 330 into the paperboard sheet 400. Referring to FIG. 4A, the light module 330 is first positioned in alignment with one of the holes 440 that were formed into the paperboard sheet 400 using the hole punch 200. Specifically, the light module 330 is positioned so that the distal end 336 of the light portion 334 of the light module 330 is adjacent to the rear surface 420 of the paperboard sheet 400. In the exemplified embodiment, the light module 330 is oriented substantially perpendicular to one of the holes 440 that were previously formed into the paperboard sheet 400. However, in other embodiments, the light module 330 may be configured at an angle other than orthogonal to the hole 440.

Referring to FIG. 4B, inserting the light module 330 into the hole 440 will be further described. As noted above, the light portion 334 of the light module 330 is positioned into alignment and perpendicular to one of the holes 440 formed into the paperboard sheet 400. Then, the light module 330 is pushed through the hole 440 via the rear surface 420 of the paper board 400 so that the light module 330 extends through the paperboard sheet 400 and exits out the front surface 410 of the paperboard sheet 400. In the exemplified embodiment, only the light portion 334, and not the neck portion 332, of the light module 330 protrudes from the front surface 410 of the paperboard sheet 400.

As noted above, the diameter $D_H$ of the hole 440 is substantially equal to the maximum transverse diameter $D_P$ of the punch portion 230 of the hole punch 200. Furthermore, the maximum transverse diameter $D_L$ of the light portion 334 is substantially equal to, or up to 10% greater than, the diameter of the hole 440. Thus, the light portion 334 securely fits through the hole 440 and extends through the front surface 410 of the paperboard sheet 400. In embodiments wherein the maximum transverse diameter $D_L$ of the light portion 334 is greater than the diameter of the hole 440, a slight amount of force can be used to facilitate inserting the light portion 334 through the hole 440.

After the light modules 330 are inserted into the holes 440 in the paperboard sheet 400, it is desirable that they be prevented from being pulled back through the holes 440. Thus, in certain embodiments the projections 430 create pressure on the light portion 334, thereby preventing it from escaping back through the hole 440 and out the rear surface 420 of the paperboard sheet 400. Furthermore, in other embodiments the proximal end 335 of the light portion 334 abuts against the projections 430 and the front surface 410 of the paper board 400 to maintain the light portion 334 in the hole 440 after insertion therethrough. When the light portion 334 protrudes from the front surface 410 of the paperboard sheet 400, at least a portion of the neck portion 332 of the light module 330 is located within the hole 440 in the paperboard sheet 440.

Figure 5:
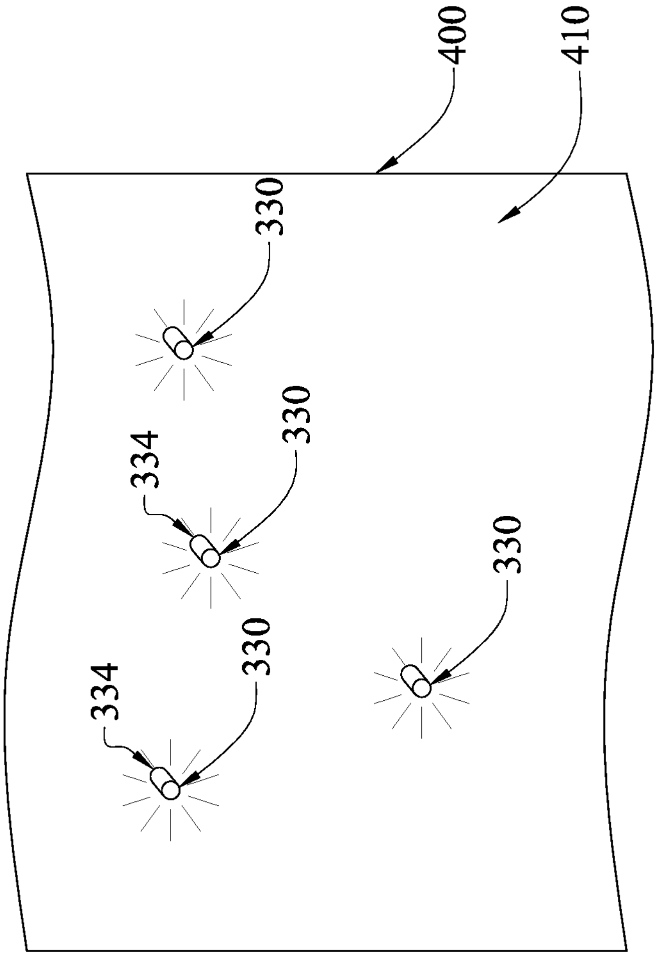
FIG. 5 is a front perspective view of the paperboard sheet with a plurality of the light modules inserted into holes formed therein.

Referring now to FIG. 5, the paperboard sheet 400 is illustrated with a plurality of the light modules 330 protruding from the front surface 410 of the paperboard sheet 400. Each light module 330 protrudes through a respective hole 440 formed in the paperboard sheet 400 as described in detail above. In the exemplified embodiment, the wire 320 and the controller 310 are not visible from the front surface 410 of the paper board 400. Therefore, the front surface 410 of the paper board 400 displays only the light modules 330 of the kit 1000 and any other illustrations, decorations, drawings, paintings or design that are made on the front surface 410 of the paperboard 400. The invention, however, is not to be so limited in all embodiments and in certain other embodiments the wire 320 and/or controller 310 may be visible from the front surface 410 of the paper board 400. Indicia, such as illustrations, decorations, drawings, paintings or other designs that are made on the front surface 410 of the paperboard 400 can be complemented by the light modules 330.

Figure 6:
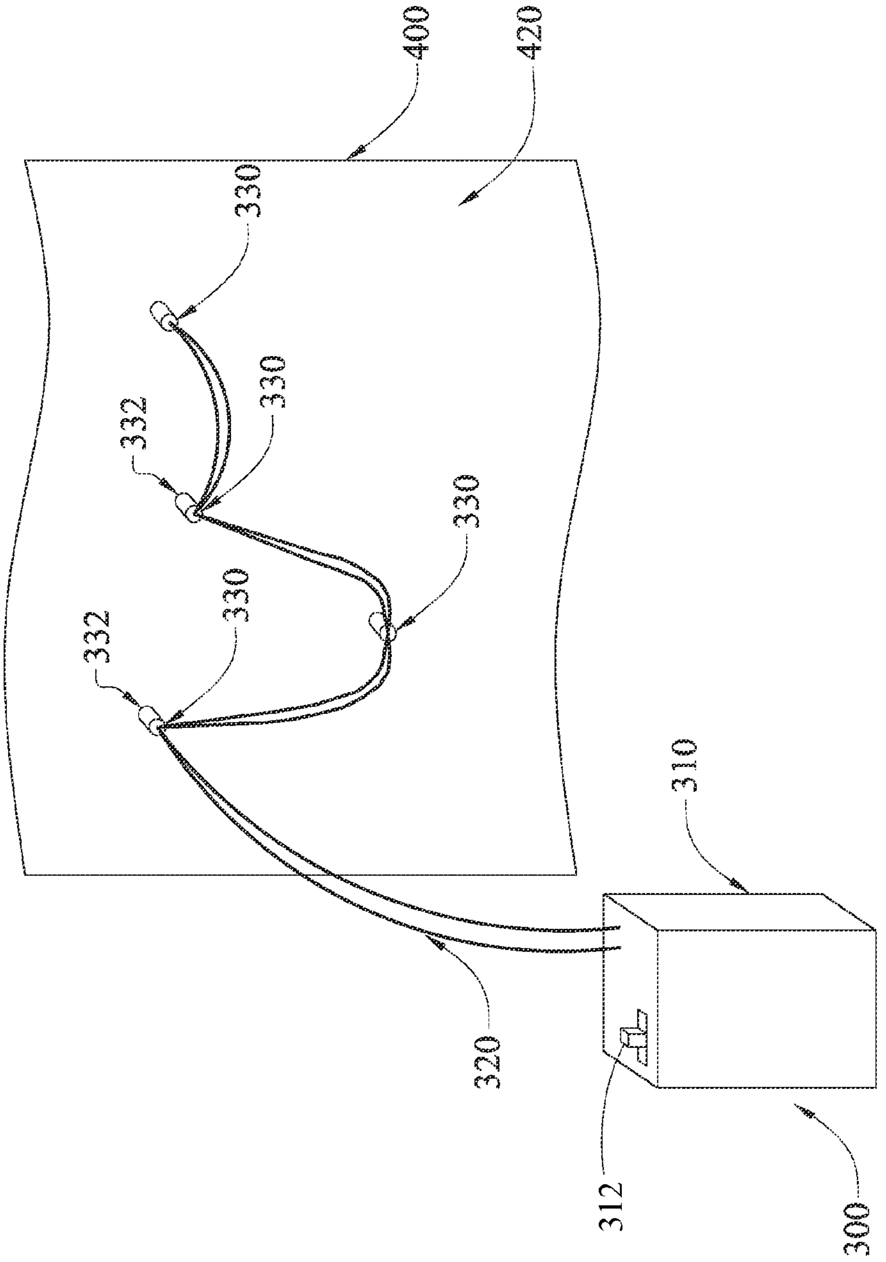
FIG. 6 is a rear perspective view of the paperboard sheet of FIG. 5 with a controller located adjacent the paperboard sheet.

Referring to FIG. 6, the rear surface 420 of the paperboard sheet 400 is illustrated with multiple light modules 330 protruding through the holes 440 formed into the paperboard sheet 400. Each light module 330 protrudes through one of the holes 440 in the paperboard sheet 400 via the rear surface 420. As discussed above, the light modules 330 are arranged in a spaced apart manner along a length of the wire 320. Further, the neck portion 332 of each light module 330 is configured to protrude into but not through the holes 440 formed into the paperboard sheet 400. Therefore, only the light portion 334 of each light module 330 is visible from the front surface 410 of the paperboard sheet 400. The invention, however, is not to, be so limited in all embodiments and in certain other embodiments the neck portion 332 of each or some of the light modules 330 may protrude through the paperboard sheet 400.

When the light modules 330 are inserted through the holes 440 formed in the paperboard sheet 400 so that the light portions 334 protrude from the front surface 210 of the paperboard sheet 200, the wire 320 of the light assembly 300 is located adjacent to the rear surface 420 of the paperboard sheet 400. In certain embodiments, at least portions of the wire 320 abut against the rear surface 420 of the paperboard sheet 400. If desired, tape or other adhesive can be used to secure the wire 320 to the rear surface 420 of the paperboard sheet 400.

Furthermore, the controller 310 is illustrated in FIG. 6 being positioned near the rear surface 420 of the paperboard sheet 400. In certain embodiments, the controller 310 may be taped or otherwise adhesively secured to the rear surface 420 of the paperboard sheet 400 so that it does not hang from the wire 320 in a manner so as to block the view of the front surface 410 of the paperboard sheet 400.

Figure 7A:
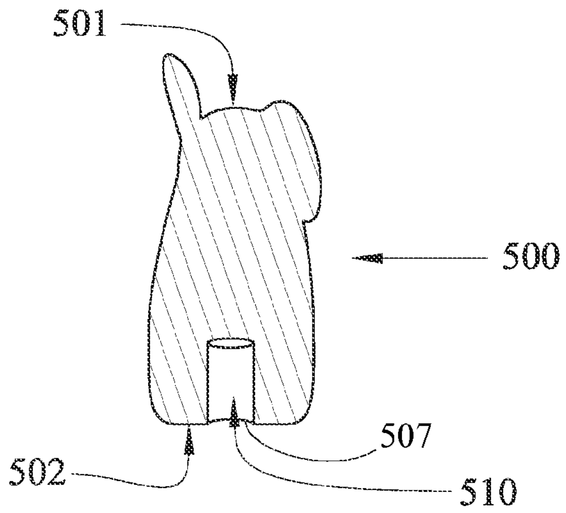
FIG. 7A is a cross-sectional view taken along line VIIA-VIIA of FIG. 2C.

Referring to FIG. 7A, the light transmissive cap 500 will be further described. The light transmissive cap 500 comprises a top surface 501, a bottom surface 502, and a bore 510. In the exemplified embodiment, the bore 510 is formed into the three-dimensional structure of the light transmissive cap 500. The bore 510 is a cutout that extends into the light transmissive cap 500 from an opening 507 in the bottom surface 502 of the light transmissive cap 500. Specifically, the bore 510 extends into the light transmissive cap 500 a distance that is equal to or greater than a height of the light module 334 measured from the proximal end 335 of the light module 334 to the distal end 336 of the light module 334. The bore 510 has a shape and size that corresponds to the shape and size of the light portion 334 of the light modules 330 so that the light portion 334 of the light modules 330 can be detachably retained within the bore 510 by an interference fit as will be discussed below with reference to FIG. 8. Thus, the bore 510 has a transverse cross-sectional profile that forms the interference fit with a transverse cross-sectional profile of the light portion 334 of the light module 330. As has been discussed above, the light transmissive cap 500 is configured to allow light illuminating from a light portion 334 of a light module 330 to transmit through it.

Figure 7B:
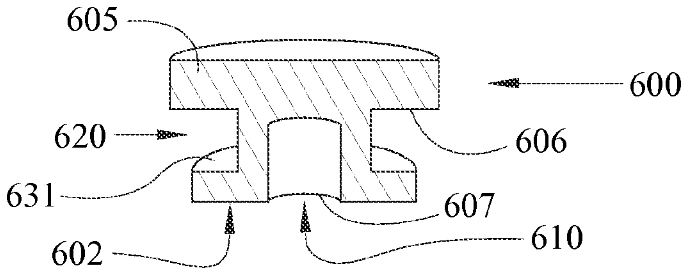
FIG. 7B is a schematic cross-sectional view of a second embodiment of a light transmissive cap in accordance with the present invention.

Referring to FIG. 7B, an alternative embodiment of a light transmissive cap 600 is illustrated in accordance with an embodiment of the present invention. The light transmissive cap 600 comprises a decorative portion 605, and an extending member 620, and an annular flange 631. The decorative portion 605 of the light transmissive cap 600 can be any one of the three-dimensional sculptures described above with regard to the light transmissive cap 500, or it can simply be a feature having a round, square, or other shape. Thus, the light transmissive cap 600 is the same as the light transmissive cap 500 except that the bore 610 of the light transmissive cap 600 is formed into the extending member 620 that extends from a decorative portion 605 of the light transmissive cap 600 rather than being formed directly into the decorative portion.

In the exemplified embodiment, the extending member 620 is cylindrical in shape so as to transverse cross-sectional profile that forms an interference fit with the transverse cross-sectional profile of the light portions 334 of the light modules 330. However, the invention is not to be so limited and the extending member 620 can take on other shapes as desired. The extending member 620 extends axially from a bottom surface 606 of the decorative portion 605 of the light transmissive cap 600. Furthermore, the extending member 630 comprises a bore 610 formed therein. The bore 610 extends into the extending member 620 from an opening 607 in a bottom surface 602 of the extending member 620 a distance that is equal to or greater than a height of the light portion 334 measured from the proximal end 335 of the light portion 334 to the distal end 336 of the light portion 334. The bore 610 has a shape and size that corresponds to the shape and size of the light portion 334 of the light modules 330 so that the light portion 334 of the light modules 330 can be detachably retained within the bore 610 by an interference fit as will be discussed below with reference to FIG. 8.

The annular flange 631 extends radially outward from the extending member 620 at or near the bottom of the extending member 620. Thus, when the light transmissive cap 600 is detachably coupled to the light portion 334 of the light module 330, the annular flange 631 assists in preventing the light portion 334 of the light module 330 from being pulled back through the hole 440 within which it is inserted. The annular flange 631 abuts against the front surface 410 of the paperboard sheet 400 when the light transmissive cap 600 is coupled to the light portion 334 of the light module 330 that is inserted into one of the holes 440 in the paperboard sheet 400.

Figure 7C:
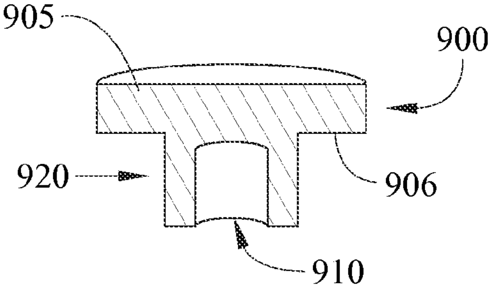
FIG. 7C is a schematic cross-sectional view of a third embodiment of a light transmissive cap in accordance with the present invention.

Referring now to FIG. 7C, a second alternative embodiment of a light transmissive cap 900 will be described. The light transmissive cap 900 is the same as the light transmissive cap 600 except that the light transmissive cap 900 does not have an annular flange. Thus, the light transmissive cap 900 merely comprises a decorative portion 905 and an extending member 920 that extends from a bottom surface 906 of the decorative portion 905. The extending member 920 comprises a bore 910 formed therein for detachably coupling the light transmissive cap 900 to one of the light modules 330 as will be described in more detail below. The decorative portion 905 of the light transmissive cap 900 can take the form of any of the three-dimensional sculptures described above with regard to the light transmissive cap 500, or it can simply be a feature having a round, square, or other shape.

Figure 8:
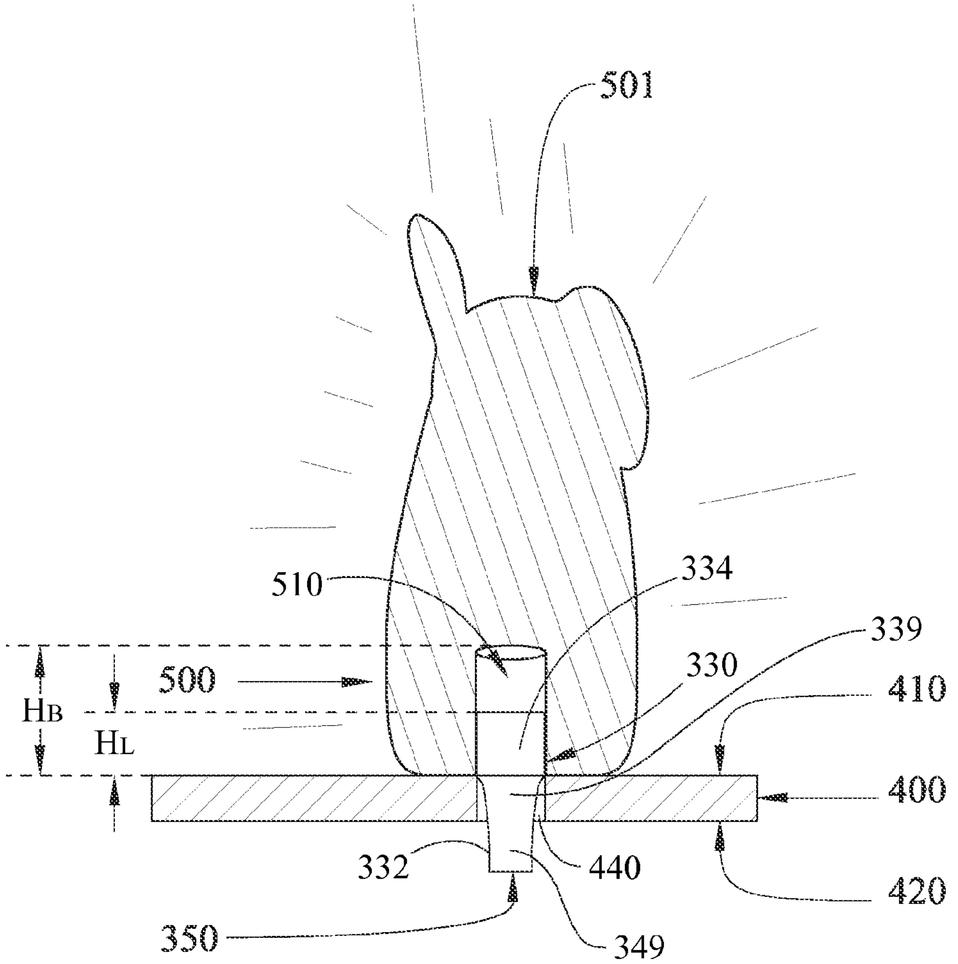
FIG. 8 is the schematic front view of FIG. 4B with the light transmissive cap of FIG. 7A coupled to the light module.

Referring to FIG. 8, a fully assembled display system is illustrated such that the light module 330 is positioned within one of the holes 440 in the paperboard sheet 400 and the light transmissive cap 500 is detachably coupled to the light portion 334 of the light module 330. Specifically, in FIG. 8 the light portion 334 of the light module 330 extends through the hole 440 in the paperboard sheet 400 and protrudes from the front surface 410 of the paperboard sheet 400. Moreover, at least a first portion 339 of the neck portion 332 of the light module 330 is located within the hole 440 in the paperboard sheet 400 while a second portion 349 of the neck portion 332 of the light module 330 protrudes from the rear surface 420 of the paperboard sheet 400.

The light transmissive cap 500 is detachably coupled to the light portion 334 of the light module 330 such that the light portion 334 of the light module 330 is retained within the bore 510 of the light transmissive cap 500 by interference fit. The bore 510 of the light transmissive cap 500 circumferentially surrounds the light portion 334 of the light module 330 to retain the light module 330 therein. Thus, in the exemplified embodiment the paperboard sheet 400 is disposed between the bottom surface 502 of the light transmissive cap 500 and the second portion of the light portion 334 of the light module 330. In certain embodiments as will be discussed below with reference to FIGS. 9A and 9B, the light module may include a flange such that after assembly the paperboard sheet 400 is disposed between the bottom surface 502 of the light transmissive cap 500 (or the annular flange 631 of the light transmissive cap 600) and the flange of the light module.

In the exemplified embodiment, the height $H_B$ of the bore 510 is greater than the height $H_L$ of the light portion 334 of the light module 330. However, the invention is not to be so limited in all embodiments and in certain other embodiments the height $H_B$ of the bore 510 is substantially equal to the height $H_L$ of the light portion 334 of the light module 330.

After assembling the display system such that the light portion 334 of the light module 330 protrudes from the front surface 410 of the paperboard sheet 400 and the light transmissive cap 500 is detachably coupled to the light transmissive portion 334 of the light module 330, the light portion 334 can be in an on mode whereby it is illuminating a light, an off mode whereby it is not illuminating light, or a flashing mode whereby the light portions 334 are flashing on and off repeatedly. When the light portion is in the on mode and is illuminating light, the illuminated light passes through the light transmissive cap 500 to be viewed.

Figure 9A:
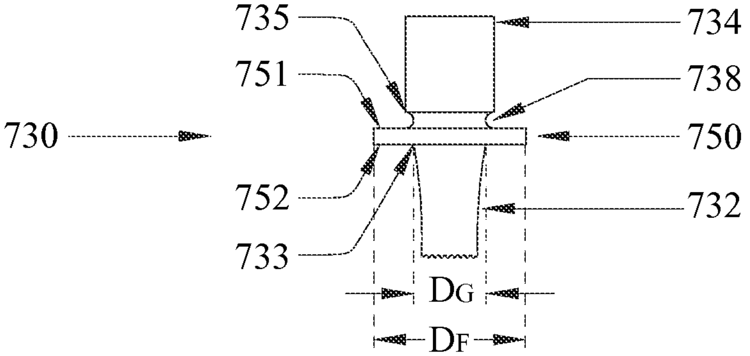
FIG. 9A is a front view of a light module having a flange and an annular groove in accordance with an embodiment of the present invention.

Referring to FIG. 9A, an alternate embodiment of a light module 730 is illustrated. The light module 730 is substantially similar to the light module 330 described above with respect to FIG. 2B, except the light module 730 comprises a flange 750 and an annular groove 738. Thus, the light module 730 comprises a neck portion 732, a light portion 734, the flange 750 and the annular groove 738.

The flange 750 is an annular flange that extends radially outward from the light module 730 at a location on the light module 730 that is in between the neck portion 732 and the light portion 734. More specifically, the flange 750 is a transversely extending flange located between the proximal end 733 of the neck portion 332 and the annual groove 338. The flange 750 comprises a top surface 751 and an opposing bottom surface 752. The flange 750 is configured so that when the light portion 734 of the light module 730 is protruding through the front surface 410 of the paperboard sheet 400, the top surface 751 of the flange 750 abuts the rear surface 420 of the paperboard sheet 400, thereby preventing the neck portion 732 from protruding through the paperboard sheet 400. As noted above, when the light module 730 is used in place of the light module 330, the paperboard sheet 400 is located between the bottom surface 502 of the light transmissive cap 500 and the flange 750 of the light module 730. The flange 350 has a maximum transverse diameter $D_F$ that is larger than the maximum transverse diameter $D_L$ of the light portion 334. Furthermore, the maximum transverse diameter $D_F$ of the flange 750 is also larger than the maximum transverse diameter $D_N$ of the neck portion 332, and larger than the maximum transverse diameter of the hole 440 formed by the hole punch 200.

The annular groove 738 is located between the distal end 735 of the light portion 734 and the top surface 751 of the flange 750. The annular groove 738 is configured so that when the light portion 734 of the light module 730 is protruding through the front surface 410 of the paperboard sheet 400 (as shown in FIG. 8), the paperboard sheet 400 extends into and is positioned within the annular groove 738 to securely attach the light module 730 into the paperboard sheet 400. Thus, the annular groove 738 facilitates preventing the light module 730 from easily exiting back through the paperboard sheet 400 via the rear surface 420. When the paperboard sheet 400 is positioned within the annular groove 738, the rear surface 420 of the paperboard sheet 400 abuts the top surface 751 of the flange 750 and the front surface 410 of the paperboard sheet 400 abuts the distal end 735 of the light portion 734. The annular groove 738 has a transverse diameter $D_G$ that is smaller than the maximum transverse diameter $D_L$ of the light portion 334 and smaller than the maximum transverse diameter $D_F$ of the flange 350.

Figure 9B:
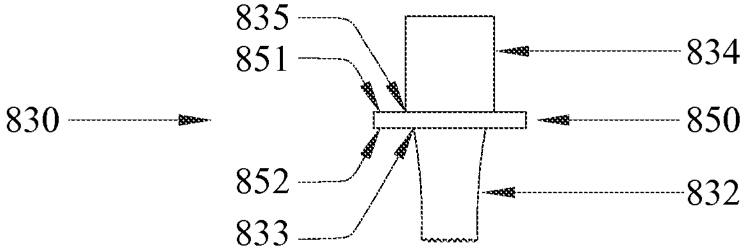
FIG. 9B is a front view of the light module of FIG. 9A without the annular groove.

Referring to FIG. 9B, another alternate embodiment of a light module 800 is illustrated in accordance with an embodiment of the present invention. The light module 830 is substantially similar to the light module 730 of FIG. 9A, except the light module 830 does not comprise an annular groove. Thus, the light module 830 comprises a neck portion 832, a light portion 834 and a flange 850. The flange 850 comprises a top surface 851 and a bottom surface 852. The flange 850 is a transversely extending flange located between the proximal end 833 of the neck portion 832 and the distal end 835 of the light portion 834. The flange 850 has a maximum transverse diameter that is larger than the maximum transverse diameter $D_L$ of the light portion 834 and larger than the maximum transverse diameter of the hole 440. The flange 850 is configured so that when the light portion 834 of the light module 830 is protruding through the front surface 410 of the paperboard sheet 400, the top surface 851 of the flange 850 abuts the rear surface 420 of the paperboard sheet 400, thereby preventing the neck portion 832 from protruding through the paper board 400.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive and the scope of the invention is not limited to the foregoing description or embodiments.

What is claimed is:

1. A kit for decorating a paperboard sheet comprising:

a package;

a hole punch comprising a handle portion and a punching portion, the punching portion having a tapered section that terminates in a distal tip, the punching portion having a maximum transverse diameter; and a light assembly comprising a string of lights, the string of lights comprising a plurality of light modules arranged in a spaced apart manner along a length of wire, each of the light modules comprising a light portion capable of being alternated between an illuminated state and a non-illuminated state and a neck portion, the neck portion having a maximum transverse diameter that is less than a maximum transverse diameter of the light portion, wherein the neck portion extends from a proximal end to a distal end and the light portion extends from a proximal end to a distal end, the proximal end of the light portion being adjacent to the distal end of the neck portion, the proximal end of the light portion having the maximum transverse diameter of the light portion and forming an annular flange relative to the distal end of the neck portion;

wherein the maximum transverse diameter of the light portion is greater than the maximum transverse diameter of the punching portion; and wherein the hole punch and the light assembly are disposed within the package.

2. The kit of claim 1 wherein the hole punch further comprises a longitudinal axis and a transverse shoulder located between the handle portion and the punching portion, the transverse shoulder extending radially outward from an outer surface of the punching portion to an outer surface of the handle portion, the handle portion and the punching portion extending along the longitudinal axis, the transverse shoulder having a maximum transverse diameter that is greater than the maximum transverse diameter of the punching portion.

3. The kit of claim 2 wherein the handle portion is an elongated member terminating at a distal end, the transverse shoulder located at the distal end of the handle portion and forming an annular flange at a base of the punching portion, and the punching portion extending from the transverse shoulder.

4. The kit of claim 1 further comprising at least one light transmissive cap comprising a bore configured to receive and detachably retain the light portion of the light module, the bore having a transverse cross-sectional profile that forms an interference fit with a transverse cross-sectional profile of the light portion of the light module.

5. The kit of claim 4 wherein the light transmissive cap comprises at least one three-dimensional decorative sculpture.

6. The kit of claim 1 wherein the light module further comprises a transversely extending flange and an annular groove located between the light portion and the transversely extending flange, the transversely extending flange having a maximum transverse diameter that is larger than the maximum transverse diameter of the light portion.

7. A kit for decorating a paperboard sheet comprising:

a package;

a hole punch extending along a longitudinal axis and being formed entirely of a material selected from the group consisting of wood and plastic, the hole punch comprising a handle portion and a punching portion, the handle portion extending from a proximal end to a distal end and terminating at a transverse shoulder that forms the distal end, the transverse shoulder forming an annular flange at a base of the punching portion, the punching portion extending from the transverse shoulder, the punching portion having a tapered section that terminates in a rounded distal tip, the transverse shoulder having a maximum transverse diameter that is greater than a maximum transverse diameter of the punching portion, the handle portion having a length and the punching portion having a length, a ratio of the length of the handle portion to the length of the punching portion being between 6:1 and 10:1;

a light assembly comprising a string of lights, the string of lights comprising a plurality of light modules arranged in a spaced apart manner along a length of wire, each of the light modules comprising a light portion capable of being alternated between an illuminated state and a non-illuminated state; and wherein the hole punch and the light assembly are disposed within the package.

8. The kit of claim 7 wherein the length of the handle portion is between 12 cm and 13 cm and wherein the length of the punching portion is between 1.3 cm and 2.0 cm.

9. The kit of claim 7 wherein the light portion has a maximum transverse diameter and the punching portion has a maximum transverse diameter, the maximum transverse diameter of the light portion being up to 10% greater than the maximum transverse diameter of the punching portion.

10. The kit of claim 9 wherein the maximum transverse diameter of the light portion is substantially equal to the maximum transverse diameter of the punching portion.

11. The kit of claim 7 wherein the handle portion has a substantially constant diameter along a length of the handle portion, the diameter of the handle portion being between 7 mm and 8 mm, and wherein the maximum transverse diameter of the punching portion is between 3 mm and 5 mm.

12. The kit of claim 7 wherein the punching portion comprises a non-tapered section that extends from the transverse shoulder to a transition point and the tapered section that extends from the transition point to the rounded distal tip of the punching portion, the non-tapered section of the punching portion having a substantially constant diameter and the tapered section having a diameter that decreases with axial distance from the transition point towards the rounded distal tip.

13. The kit of claim 7 wherein the transverse shoulder extends radially outward from an outer surface of the punching portion to an outer surface of the handle portion.

* * * * *